United States Patent
Yu et al.

(10) Patent No.: US 9,323,427 B2
(45) Date of Patent: Apr. 26, 2016

(54) METHOD AND APPARATUS FOR DISPLAYING LISTS

(75) Inventors: Seock Hyun Yu, Seoul (KR); Giang Yoon Kwon, Seoul (KR); Chang Mo Yang, Gyeonggi-do (KR); Jae Myung Lee, Seoul (KR); Yu Sic Kim, Sanggye (KR); Bo Young Lee, Seoul (KR); Eun Ju Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 709 days.

(21) Appl. No.: 13/270,337

(22) Filed: Oct. 11, 2011

(65) Prior Publication Data

US 2012/0144342 A1 Jun. 7, 2012

(30) Foreign Application Priority Data

Dec. 7, 2010 (KR) ........................ 10-2010-0124242

(51) Int. Cl.
*G06F 3/0483* (2013.01)
*G06F 3/0482* (2013.01)

(52) U.S. Cl.
CPC ............ *G06F 3/0483* (2013.01); *G06F 3/0482* (2013.01)

(58) Field of Classification Search
None
See application file for complete search history.

(56) References Cited

U.S. PATENT DOCUMENTS

| | | | |
|---|---|---|---|
| 2005/0091596 A1* | 4/2005 | Anthony et al. | 715/712 |
| 2005/0257166 A1 | 11/2005 | Tu | |
| 2006/0271867 A1 | 11/2006 | Wang et al. | |
| 2007/0058210 A1 | 3/2007 | Sakuramata et al. | |
| 2008/0034381 A1* | 2/2008 | Jalon | G06F 17/30126 719/329 |
| 2008/0094370 A1 | 4/2008 | Ording et al. | |
| 2008/0129757 A1* | 6/2008 | Tanaka et al. | 345/660 |
| 2008/0307343 A1* | 12/2008 | Robert | G06F 3/04817 715/765 |
| 2008/0307363 A1* | 12/2008 | Jalon | G06F 17/30126 715/835 |
| 2009/0064012 A1 | 3/2009 | Tremblay | |
| 2009/0106674 A1* | 4/2009 | Bray | G06F 17/30112 715/762 |
| 2009/0172532 A1* | 7/2009 | Chaudhri | 715/702 |
| 2009/0178000 A1* | 7/2009 | Kwon et al. | 715/810 |
| 2010/0023858 A1 | 1/2010 | Ryu et al. | |
| 2010/0153844 A1* | 6/2010 | Hwang et al. | 715/702 |
| 2011/0138313 A1* | 6/2011 | Decker | G06F 3/0481 715/777 |
| 2011/0296351 A1* | 12/2011 | Ewing et al. | 715/841 |
| 2012/0026529 A1 | 2/2012 | Sakuramata et al. | |

FOREIGN PATENT DOCUMENTS

| | | | |
|---|---|---|---|
| CN | 1910577 A | 2/2007 | |
| CN | 101635768 A | 1/2010 | |
| EP | 1 705 583 A1 | 9/2006 | |
| EP | 1 783 999 A2 | 5/2007 | |
| EP | 2136290 A2 | 12/2009 | |
| JP | 9-34678 A | 2/1997 | |
| JP | 10-133842 | 5/1998 | ............... G06F 3/14 |
| JP | 2005-202635 A | 7/2005 | |

(Continued)

*Primary Examiner* — Hien Duong
(74) *Attorney, Agent, or Firm* — Cha & Reiter, LLC

(57) ABSTRACT

A list display method and apparatus are disclosed. The list display method, for a terminal having a display unit, includes detecting a necessity for displaying a list, classifying list items into viewable items and aggregated items, displaying the viewable items in the list view region and displaying information regarding the aggregated items in the list aggregate region. Responsive to inputs aggregate items may be classified as viewable items and corresponding ones of the viewable items are classified as aggregate items.

14 Claims, 12 Drawing Sheets

(56) References Cited

FOREIGN PATENT DOCUMENTS

| | | | | |
|---|---|---|---|---|
| JP | 2007-110677 A | 4/2007 | | |
| KR | 2003-0088374 | 11/2003 | ................ | G06F 3/00 |
| WO | 2005/069170 A1 | 7/2005 | | |

\* cited by examiner

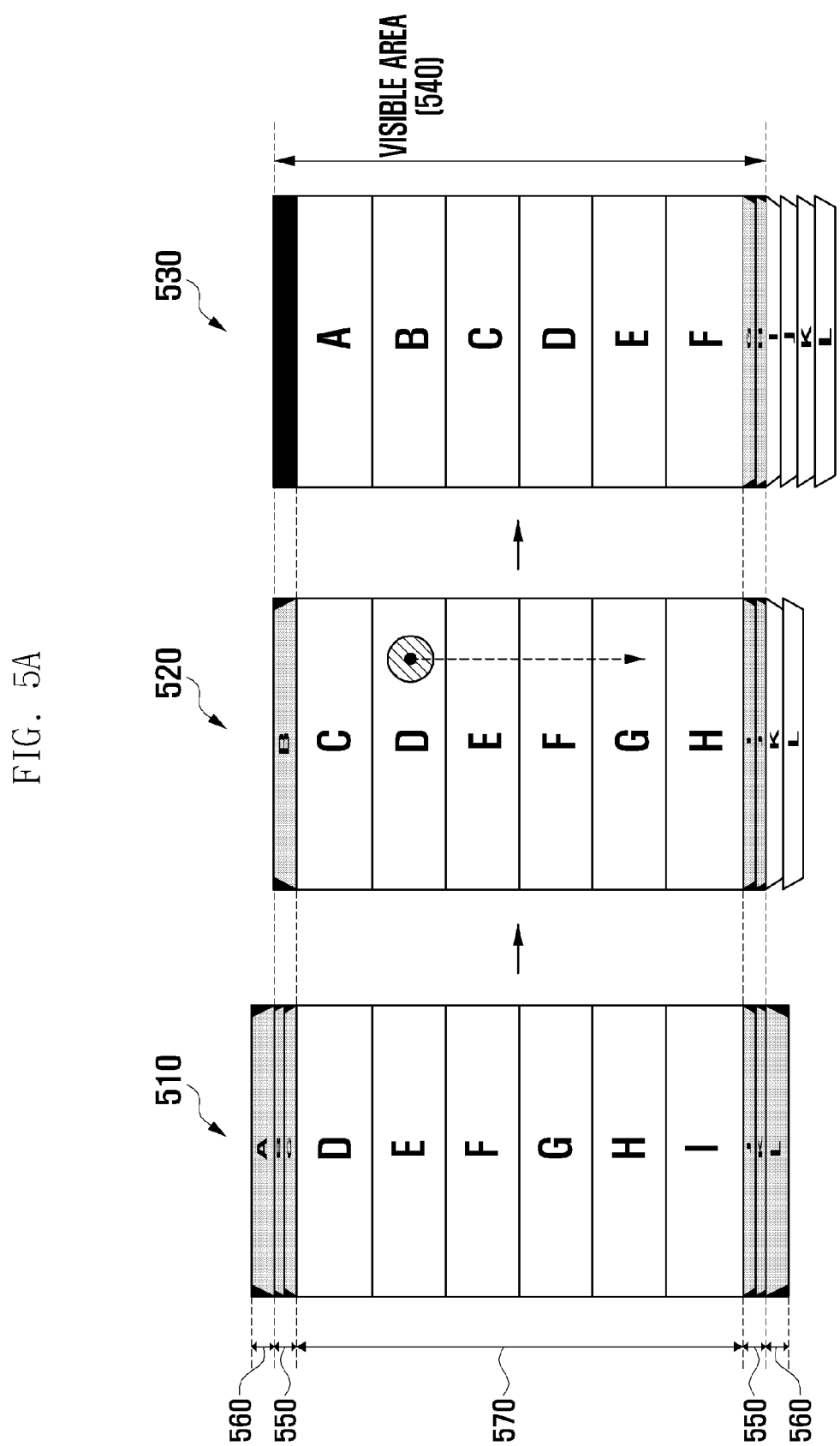

METHOD AND APPARATUS FOR DISPLAYING LISTS

CLAIM OF PRIORITY

This application claims, pursuant to 35 USC 119, priority to, and the benefit of the earlier filing date of, that patent application filed in the Korean Patent Office, entitled "Method and Apparatus for Displaying Lists," on Dec. 7, 2010 and afforded serial number 10-2010-0124242, the contents of which are incorporated by reference, as if in full, herein.

BACKGROUND OF THE INVENTION

1. Field of the Invention

The present invention relates to Graphic User Interfaces and, more particularly, to a method and apparatus for displaying lists on a display of a mobile terminal.

2. Description of the Related Art

FIG. 1 illustrates a conventional display of a list according to the related art.

As illustrated, with reference to the list including items A-J and referred-to by reference label 110 of FIG. 1, list items D to J are displayed in a visible area 130, which items A-C are in an area that is not displayed. Because of the limited size of the display screen only a select number of items within the list are within the viewing area and displayed to the user.

To view one of the items A-C not in the visible area 130, the user has to scroll through the list so that the desired item is located in the visible area 130. To traverse the entire list, the user may have to repeatedly scroll through the list so that a desired item is located in the visible area 130. In this case, when a touch screen is considered, the user taps a location in the viewable area (as indicated by the hashed circle in list 110) and draws the tapped (touched) area downward (as indicated by the directional arrow).

The result of the scrolling, as shown in list 120, draws the unseen items A-C into the visible area, while items H-J are removed from the visible area 130.

As described above, when the user of a mobile terminal views a page or list that does not fit within in the visible area 130, the existing display method may fail to provide to the user information regarding information what is outside the visible area 130. When information regarding items of a list present outside the visible area 130 is not provided, it is difficult for the user to obtain holistic information on all the list items.

SUMMARY OF THE INVENTION

The present invention has been made in view of the above problems, and the present invention provides method and apparatus for displaying lists on a mobile terminal having a limited screen size that enables the user to obtain information on all list items or pages and to control the list display in an easy and convenient manner.

In accordance with an exemplary embodiment of the present invention, there is provided a list display method for a terminal having a display unit, including detecting a necessity of displaying a list, classifying list items into viewable items and aggregated items; displaying the viewable items in a list view region and displaying information regarding the aggregated items in a list aggregate region.

In accordance with another exemplary embodiment of the present invention, there is provided a mobile terminal for displaying lists, including a list classifier classifying list items into viewable items and aggregated items and a display unit displaying the viewable items in a list view region and displaying information regarding the aggregated items in a list aggregate region.

In a feature of the present invention, the user of a mobile terminal having a limited screen size may obtain information on all list items or pages and control list display in an easy and rapid way.

BRIEF DESCRIPTION OF THE DRAWINGS

The features and advantages of the present invention will be more apparent from the following detailed description in conjunction with the accompanying drawings, in which:

FIGS. 5A and 5B are graphic representation of processing for viewing a list display according to a third embodiment;

DETAILED DESCRIPTION OF THE INVENTION

Figure 1:
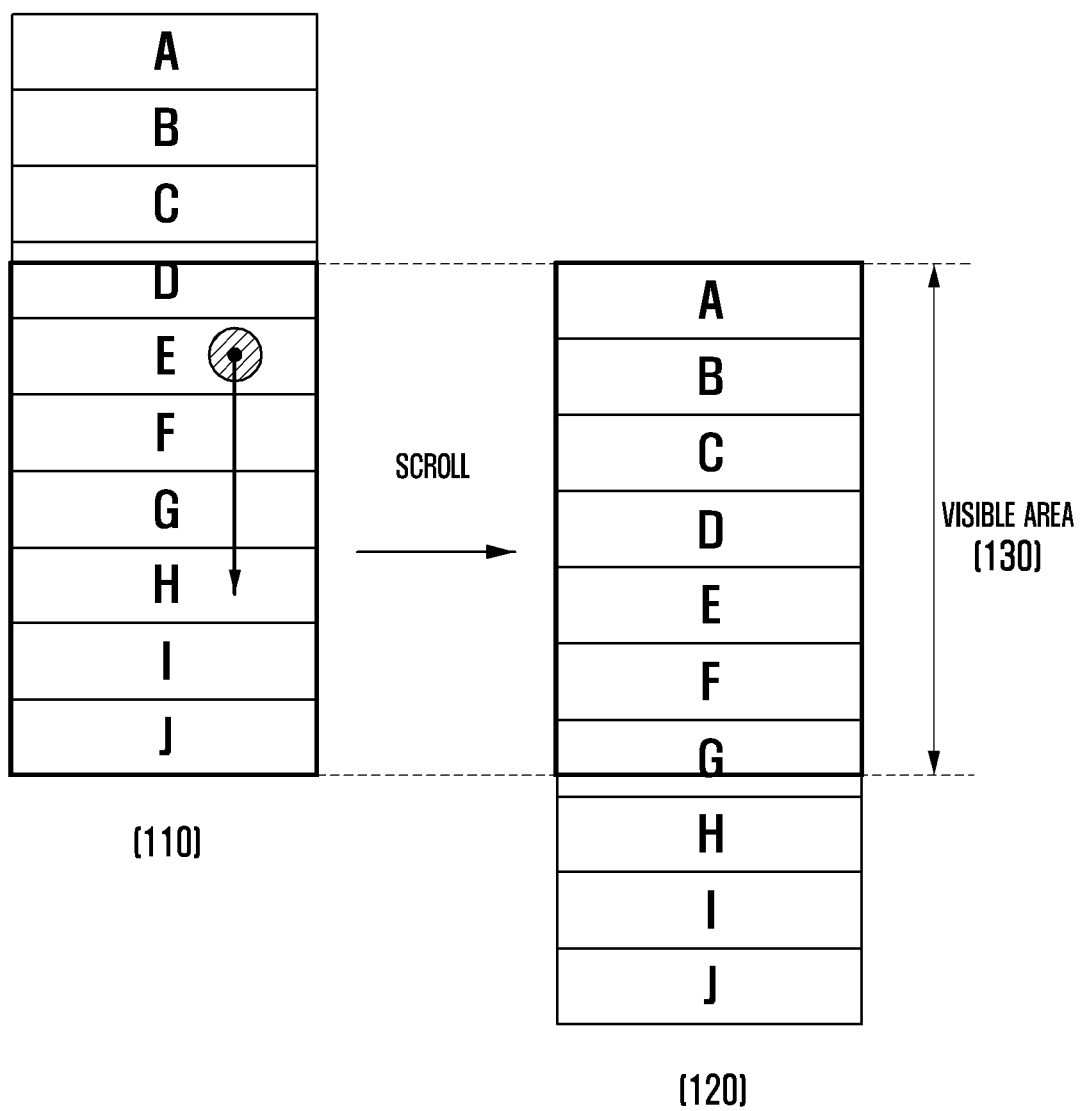
FIG. 1 illustrates display of a list according to the related art.

Exemplary embodiments of the present invention are described in detail with reference to the accompanying drawings. Detailed descriptions of well-known functions and structures incorporated herein may be omitted to avoid obscuring the subject matter of the present invention. In the drawings, some elements are exaggerated or only outlined in brief, and, thus, may be not drawn to scale. The same reference symbols are used throughout the drawings to refer to the same or like parts.

In the description, a "list" refers to a set of ordered items to be displayed on the screen (display) of a mobile terminal. List items may correspond to data elements. For example, currently running applications may be items forming a list. Contact addresses may be items forming a list. An electronic book having many pages may be considered as a list of pages. Other data elements or objects may also be list items, which when joined together represent a list.

Next, a list display method and a mobile terminal executing the method are described with reference to the accompanying drawings.

Figure 2:
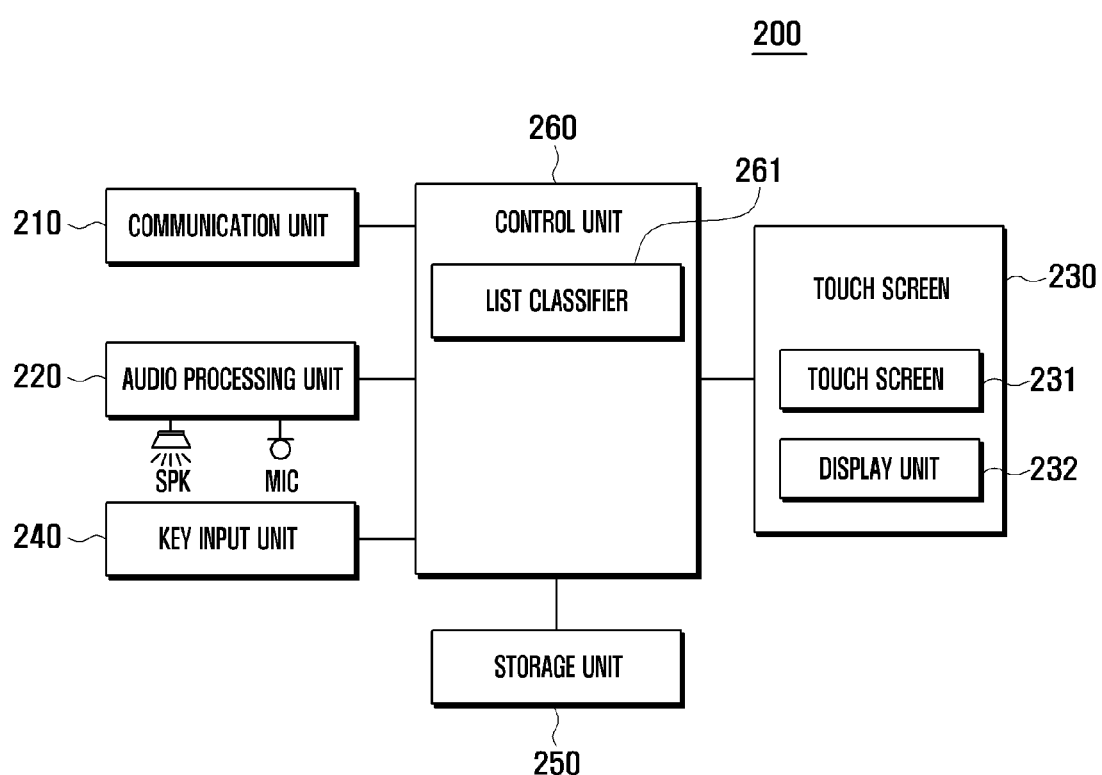
FIG. 2 is a block diagram of a mobile terminal according to an exemplary embodiment of the present invention.

FIG. 2 is a block diagram of a mobile terminal according to an exemplary embodiment of the present invention.

Referring to FIG. 2, the mobile terminal may include a communication unit 210, an audio processing unit 220, a touchscreen 230, a key input unit 240, a storage unit 250, and a control unit 260.

The communication unit 210 performs data transmission and reception for the mobile terminal. The communication unit 210 may include a radio frequency (RF) transmitter (not shown) for up-converting the frequency of a signal to be transmitted and amplifying the signal, and an RF receiver (not shown) for low-noise amplifying a received signal and down-converting the frequency of the received signal. The communication unit 210 may forward data received through a wired or wireless channel to the control unit 260, and transmit data from the control unit 260 through a wired or wireless channel.

The audio processing unit 220 may include a coder/decoder (codec) (not shown). The codec may have a data codec for processing packet data and the like, and an audio codec for processing an audio signal, such as a voice signal. The audio processing unit 220 converts a digital audio signal into an analog audio signal through the audio codec to reproduce the analog audio signal using a speaker SPK, and converts an analog audio signal from a microphone MIC into a digital audio signal through the audio codec.

The communication unit 210 and the audio processing unit 220 may be excluded when the mobile terminal does not have to handle communication and audio processing. The present invention may be applied to a mobile terminal with or without the communication unit 210 or the audio processing unit 220.

The touchscreen 230 includes a touch sensor 231 and a display unit 232. The touch sensor 231 detects a touch input of the user. The touch sensor 231 may be realized using a capacitive, resistive, infrared or pressure sensor. In the present invention, any sensor capable of detecting contact or pressure may be utilized as the touch sensor 231. The touch sensor 231 generates a touch signal corresponding to a user's touch (or tap) and sends the touch signal to the control unit 260. The touch signal carries coordinate data of the touch point that describe the location at which the touch or tap occurred. When the user makes a touch-point move gesture, the touch sensor 231 generates a touch signal carrying coordinate data describing the path of the touch-point move and forwards the corresponding generated touch signals to the control unit 260.

In particular, the touch sensor 231 detects a user input (for example, a touch, a multi-touch or a drag) for scrolling or displaying the items contained within a list.

The display unit 232 may be realized using liquid crystal display (LCD) devices, organic light emitting diodes (OLED), or active matrix organic light emitting diodes (AMOLED). The display unit 232 provides various information, such as menus, input data and function-setting data, to the user in a visual form. The display unit 232 may output a boot screen, an idle screen, a menu screen, a call handling screen and other application screens.

Although the mobile terminal is depicted as having a touchscreen capability, the present invention may be applied to a mobile terminal with or without a touchscreen capability. When the present invention is applied to a mobile terminal without a touchscreen capability, the function of the touchscreen 230 may be limited to that of the display unit 232.

In particular, the display unit 232 may allocate a list view region and a list aggregate region in the visible area (as will be more fully described with regard to FIG. 5A, for example). The display unit 232 may display a viewable item in the list view region and display information regarding aggregated items in the list aggregate region. Here, the visible area refers to the entirety of the display unit 232 in which information is displayable. A viewable item is an item displayed in the list view region. Information regarding aggregated items is displayed in the list aggregate region. The number of aggregated items or other information regarding aggregated items may be displayed in the list aggregate region. Information regarding aggregated items may be displayed in a scaled form in the list aggregate region. Operations of the display unit 232 are described in detail in connection with FIGS. 3 to 11.

The key input unit 240 generates an input signal corresponding to key manipulation(s) by the user and sends the input signal to the control unit 260. The key input unit 240 may include a keypad including numeric and direction keys (not shown), and function keys attached to sides of the mobile terminal. When the mobile terminal can be operated using only the touchscreen 230, the key input unit 240 may be excluded.

The storage unit 250, which may be composed of one or more memory type, stores programs and data needed for operation of the mobile terminal, and may include a program area (not shown) and a data area (not shown). The program area stores an operating system that boots the mobile terminal and controls the overall operation thereof, application programs for playing back multimedia content, other application programs related to a camera, sound reproduction, and playback of still or moving images. The data area represents an area that stores data generated in the course of using the mobile terminal. For example, images, moving images, phonebooks and audio data may be stored in the data area. Similarly, contact information and manufacturer and/or user settings may be included in the data area. In particular, the storage unit 250 stores information regarding lists and list items to be displayed on the display unit 232. The information regarding stored lists and list items may be displayed on the display unit 232 when necessary.

The control unit 260, which may comprise a processor, a processing unit, a computer, etc., controls overall operations of individual components of the mobile terminal. In particular, the control unit 260 includes a list classifier 261.

The list classifier 261 operates to respond to inputs associated with the displaying of one or more particular lists that may be stored within the storage unit 250 or available through a communication via communication unit 210. When a display request for a list is detected, the list classifier 261 divides items of the list into viewable items for the list view region and aggregated items for the list aggregate region. Then, the display unit 232 displays those items included within the list view region and displays information regarding the items in the list aggregate region in an aggregated form, as will be more fully described. The configuration and operation of the list classifier 261 are described in detail with reference to FIGS. 3 to 11.

Figure 3:
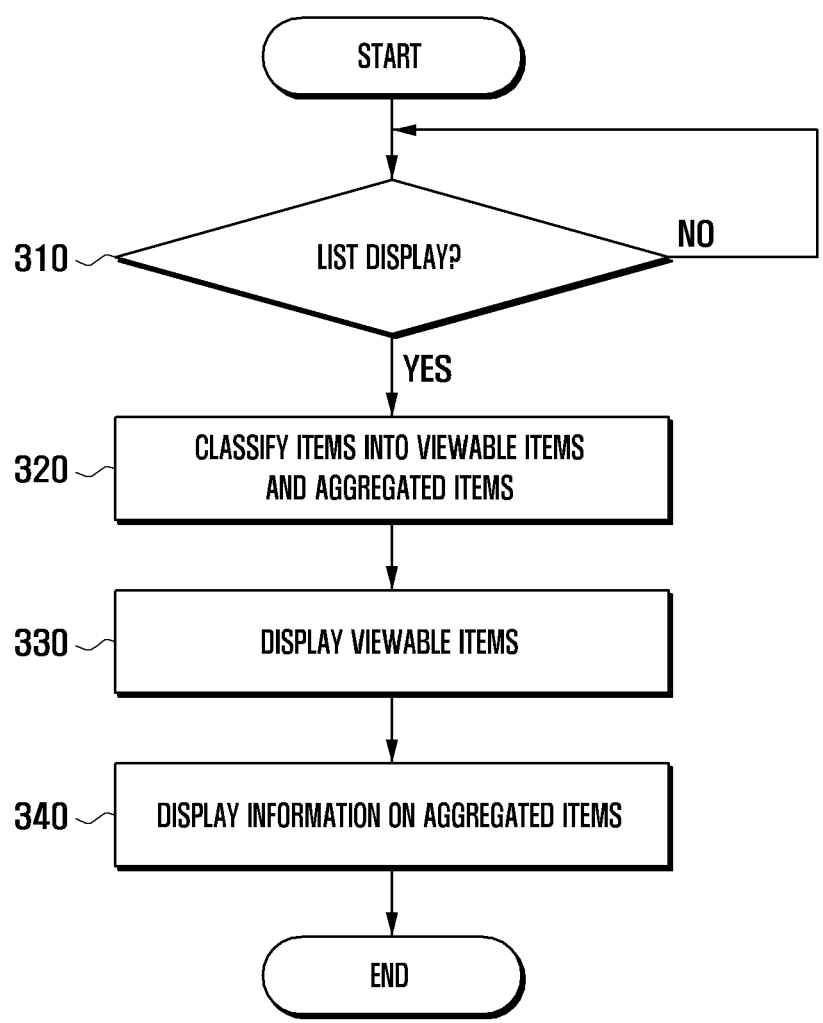
FIG. 3 is a flowchart of a list display method according to a first embodiment of the present invention.

FIG. 3 is a flowchart of a list display method according to a first embodiment of the present invention.

The list classifier 261 checks whether a request for the display is a list has been received (S310). For example, reception of a request for viewing an address book from the user may indicate that a list display is necessary. Reception of a scroll request from the user during display of a list may also correspond to the necessity of a list display. When two or more applications having associated control screens are running on the mobile terminal, the control screens associated with the individual applications may be items of a running application list. In this case, executing two or more applications having associated control screens may also correspond to the necessity for displaying a list of control screens.

In addition, the list classifier 261 may recognize the necessity of displaying a list, without an input from the user. For example, when the display of an address book is prescheduled to occur at a specific time, (e.g., To-Do list at 8 Am each day) the list classifier 261 may initiate the display of the corresponding list at the scheduled time. Other conditions such as temperature, humidity and ambient illumination may trigger a list display. Otherwise, the list classifier 261 waits at step 310 until the necessity of providing a list display is detected.

When the necessity of a list display is recognized, the list classifier 261 classifies items of the designated list to be displayed into viewable items and aggregated items (S320). The viewable items are items to be immediately displayed on the display unit 232. For example, in a call log, items associated with the ten (10), for example, most recent calls may be classified into viewable items, while items associated with other calls may be classified into aggregated items. Later, when the user scrolls through the list, list items are reclassified (i.e., viewable and/or aggregated). Hence, the viewable items and the aggregated items may change whenever the list is scrolled. As another example, when searching an address book, matching address items (matching the search word or number) and a number of other address items following the found address item may be classified into viewable items and the remaining address items may be classified as aggregated items. In existing methods, information regarding aggregated items is not displayed on the display unit 232. In the present invention, information regarding aggregated items may be displayed on the display unit 232, as will be discussed with regard to the processing shown in FIGS. 3-11.

In another aspect, the number of items in the view region may be determined based on the characteristics of the display and a desired size of each viewable item. For example, a display size of 320×160 resolution may include no more than 10 items if the desired size of each viewable item is 32×160. In the size of the view region may be reduced based on the size of the at least one aggregate region. For example with a display size of 320×160 and two aggregate regions of 32×160 each, a maximum of eight 32×160 items may be included in the view region. However, if the desired viewable item size is 16×160, then up to 16 items may be presented in the view region.

In another aspect, the number of items in the view region may be fixed and the size (resolution) of each item may be determined in a manner similar to that described above.

The display unit 232 displays the viewable items in the list view region (S330). The viewable items may be displayed in various ways. For example, to display an address list, names and shortcut numbers in address items may be displayed in a preset manner.

The display unit 232 displays information regarding the aggregated items in the list aggregate region (S340). In one embodiment, only the number of aggregated items may be displayed in the list aggregate region. In another embodiment, the aggregated items may be displayed in an aggregate form in the list aggregate region. Display of information regarding aggregated items is described in detail with reference to FIGS. 4 to 11.

Figure 4:
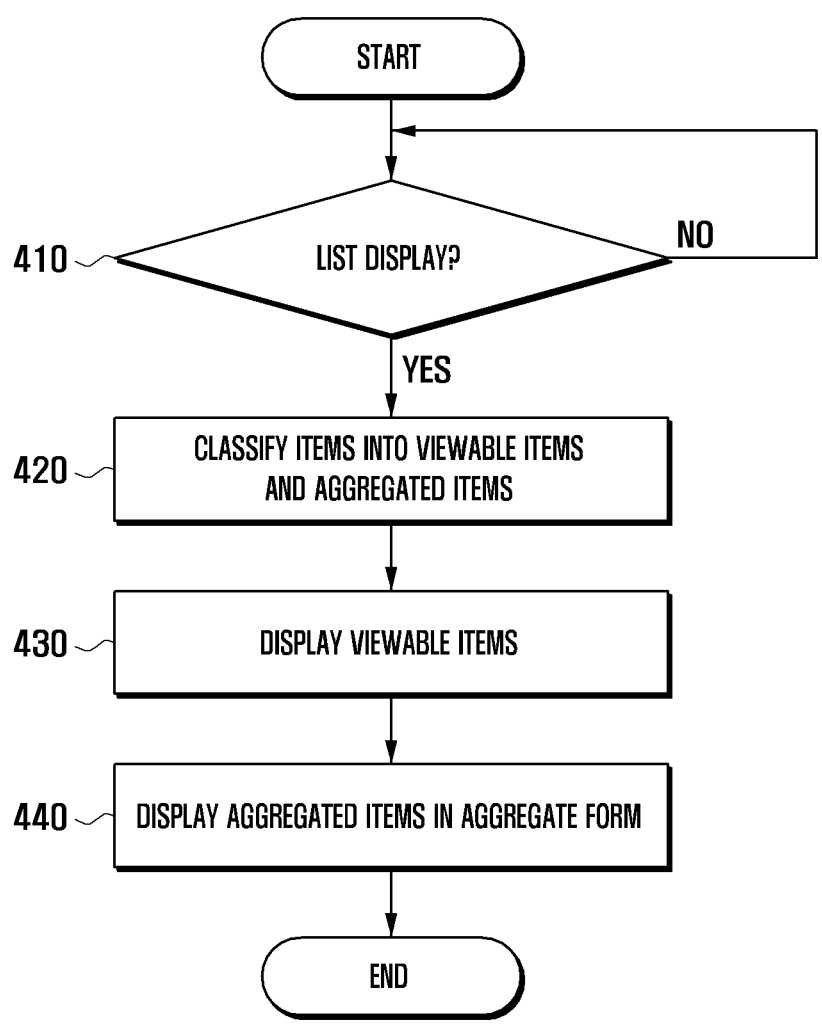
FIG. 4 is a flowchart of a list display method according to a second embodiment of the present invention.

FIG. 4 is a flowchart of a list display method according to a second embodiment of the present invention.

Steps 310 to 330 of FIG. 4 correspond respectively to steps 310 to 330 of FIG. 3, and a description thereof is omitted.

Step 440 of FIG. 4 is a variant of step 340 of FIG. 3. At step 440, the display unit 232 displays the aggregated items in an aggregate form. Display of the aggregated items in aggregate form is described in detail with reference to FIGS. 5A to 7 (third to fifth embodiments).

Figure 5B:
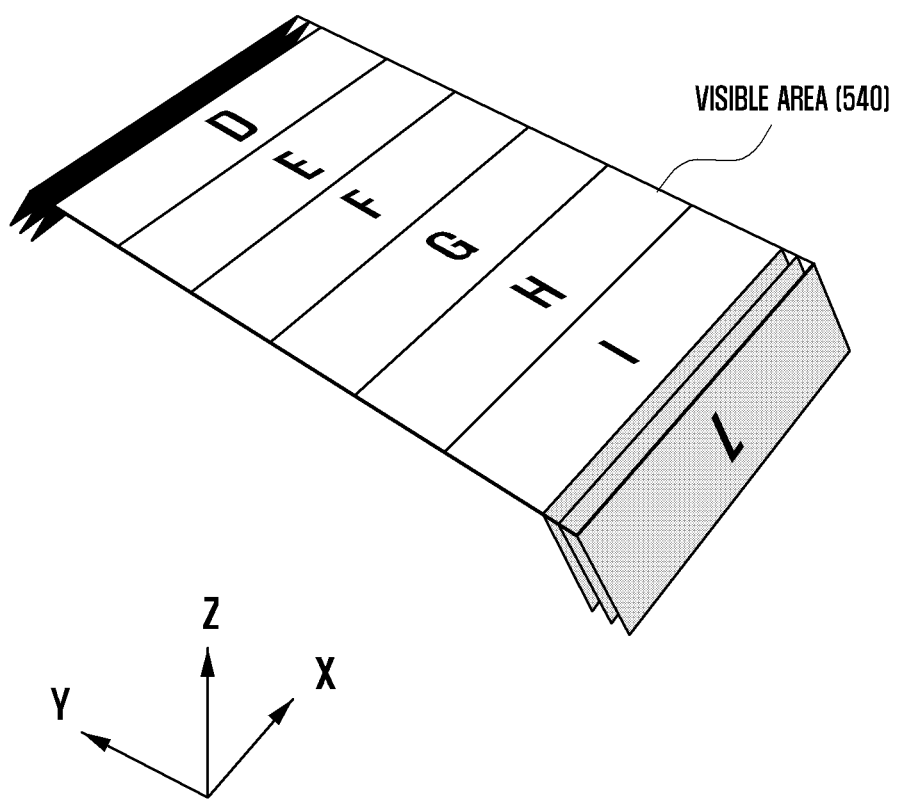

FIGS. 5A and 5B are graphic representation of processing for a list display according to a third embodiment.

Referring to FIG. 5A, element 530, the display unit 232 assigns a list view region 570 and list aggregate regions 550 in the visible area 540. Exterior regions 560 are shown for easy description but are not visible to the user.

As described in connection with FIGS. 3 and 4, in this embodiment, the display unit 232 displays viewable items in the list view region 570. At step 510, items D to I are displayed in the list view region 570. Items B and C and J and K are shown in aggregated area 550. Items A and L are not with either the viewing area or the aggregated area as will be described later.

In response to scroll inputs from the user, as indicated by the hashed circle and directional arrow shown on element 520, items C to H which are displayed in the list view region 570 in element 520 replace items D to H (of element 510) and further more items A to F replace items C to H (of elements 520) and are displayed at element 530, as the scroll input continues. That is, in response to the touch (and drag) operation shown in element 520, items B then A are brought into the viewing region 570 from the aggregated region 550, while items H and G are moved to the aggregated region 550. In element 530, as there are no items prior to item A, then the aggregated region 550 is empty.

That is, the items that replace the items in the view region, in this exemplary embodiment, are selected from the aggregate region opposite the direction of the input.

The display unit 232 displays aggregated items in an aggregate form in the list aggregate regions 550. In FIGS. 5A and 5B, when displayed, aggregated items are tilted at preset angles with respect to the screen so as to represent a perspective view. That is, in a displayed aggregated item, the side near the user may be shorter than that further from the user. When displayed, the aggregated items thus appear tilted with respect to the sides near to the list view region 570 as axes. For example, at element 510, items A to C above the list view region 570 are tilted in a direction opposite to the z-axis (in a direction receding from the screen or into the plane of the page being viewed) using the sides near to the item D as axes. When there are two or more aggregated items in a list aggregate region 550, the aggregated items may be displayed so as to overlap each other. When there are not too many aggregated items, some information regarding the aggregated items may be visible to the user. For example, at element 510, the letters (B and C) of the items B and C are partially visible. When aggregated items overlap each other, an aggregated item near a viewable item may be located behind another aggregated item far from the viewable item (in a direction opposite to the z-axis).

The area of a list aggregate region 550 is constant, but the number of aggregated items to be displayed in the list aggregate region 550 may differ. When there are a large number of aggregated items to be displayed in the list aggregate region 550, the aggregated items are densely arranged in the list aggregate region 550. And when there are a small number of aggregated items, the aggregated items are sparsely arranged in the list aggregate region 550. When there is no aggregated item to be displayed in a list aggregate region 550, the list aggregate region 550 may be empty. This description of the presentation of items in the aggregate region 550 is the same for the embodiments of the invention described herein.

FIG. 5B illustrates a prospective view of the display to show the aforementioned axis orientation, wherein items not within the visible area 540 are represented as a folded down element. However, it would be recognized that presentation is merely to convey the idea that the items in the aggregated region are truncated in their presentation of the display and only a smaller part is visible to the user when the items are in this aggregated region.

As described, the list classifier 261 classifies list items into viewable items and aggregated items according to scrolling inputs or other conditions, and the display unit 232 displays the viewable items and the aggregated items. This process is also performed in FIGS. 6 to 11.

As in FIGS. 5A and 5B, there may be two list aggregate regions 550. List items preceding viewable items may be displayed in the upper list aggregate region 550, and list items following the viewable items may be displayed in the lower list aggregate region 550. There may also be a single list aggregate region 550. Cases with a single list aggregate region 550 are illustrated in connection with FIGS. 9 and 10.

Figure 6:
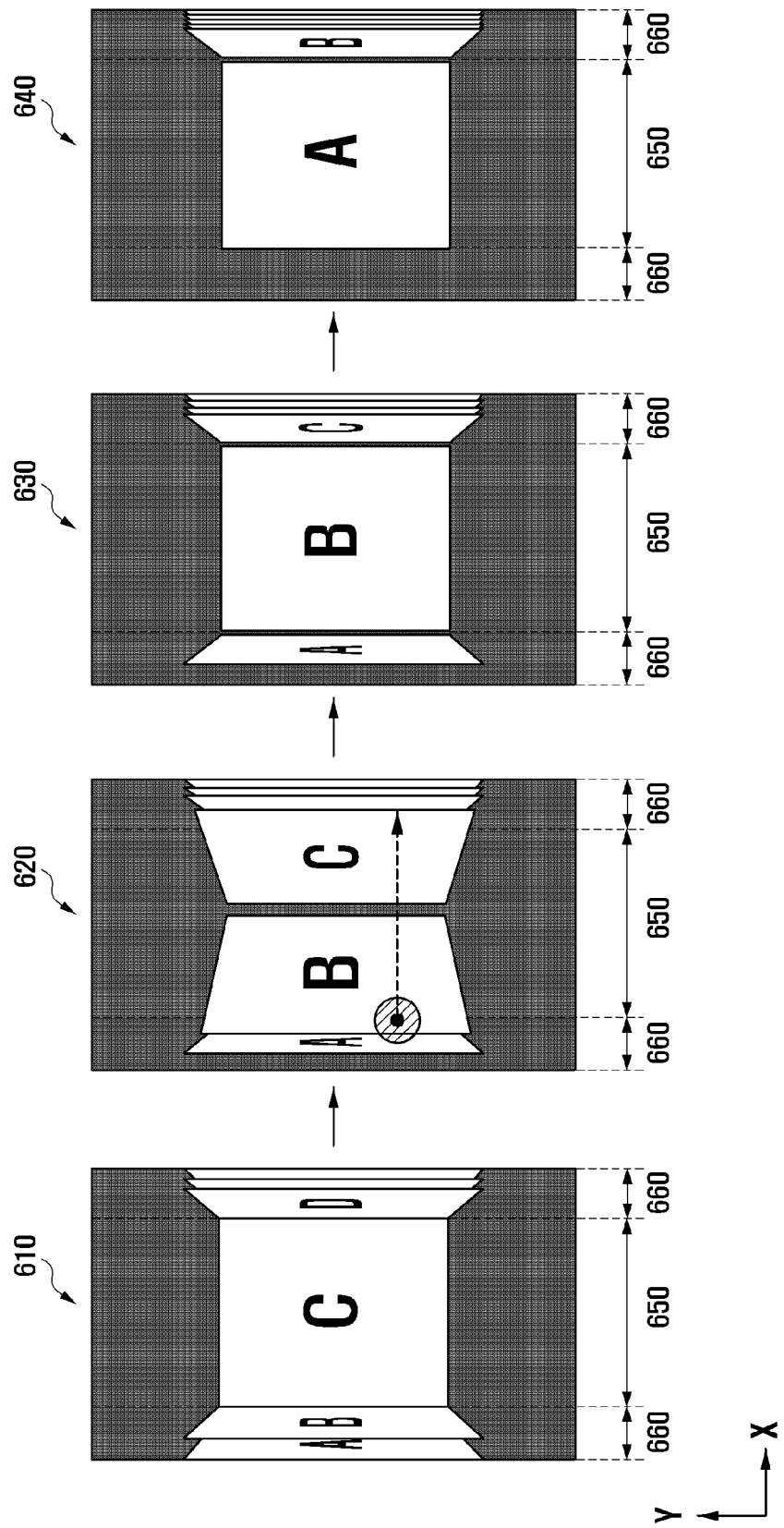
FIG. 6 illustrates a graphic representation of processing for viewing a list display according to a fourth embodiment.

FIG. 6 illustrates graphic representation of processing for a list display according to a fourth embodiment.

Referring to FIG. 6, the display unit 232 assigns a list view region 650 and list aggregate regions 660 in the visible area. In this case, the list aggregate regions are horizontally positioned with respect to the list view region 650. In this embodiment, a single item is displayed in the list view region 650 (element 610).

At element 610, an item C is displayed in the list view region 650 an a plurality of items (A and B) are displayed in the left aggregated region 660 and a single item (D) is displayed in the right aggregated region 660. In this case, the prospective view of items A and B and D in corresponding aggregated regions 660 are more clearly illustrated As the user scrolls through the list (as indicted by the hashed circle and directional arrow0, item B is drawn from the aggregated region 660 and item C is moved into the aggregated region 660. In this illustrated example, items B and C are partially displayed in the list view region 650 at element 620. As the scroll continues, the item B is fully displayed in the list view region 650 at element 630, and item A is eventually displayed at step 640. Items C and B are moved into the right aggregated area 660 in response to the scroll to the right shown in element 620.

The display unit 232 further displays aggregated items in an aggregate form in the list aggregate regions 660. In FIG. 6, when displayed, aggregated items are tilted at preset angles with respect to the screen so as to represent a perspective view. When displayed, the aggregated items are tilted using the side near to the list view region 650 as an axis. That is, in a displayed aggregated item, the side near the user may be shorter than that far from the user. For example, at element 610, items A and B on the left of the list view region 650 are tilted in a direction protruding from the screen using the sides near to the item C as axes. When there are two or more aggregated items in a list aggregate region, the aggregated items may be displayed so as to overlap each other. When there are not too many aggregated items, some information of the aggregated items may be visible to the user. For example, at element 610, the letters (A and B) of the items A and B are visible in part. When aggregated items overlap each other, an aggregated item near a viewable item may be located above another aggregated item far from the viewable item (in a direction protruding from the screen) in order to denote a particular order. Hence, the topmost aggregated item (for example, the item B nearest to the list view region) is tilted but is fully visible.

As element 620 depicts, in response to a scroll input from the user, an item B is moved from the left list aggregate region 660 to the list view region 650 and an item C is moved from the list view region 650 to the right list aggregate region 660. This may generate a visual effect of stacking and spreading cards.

Generally, the area of a list aggregate region 660 is constant, but the number of aggregated items to be displayed in the list aggregate region 660 may differ. When there are a large number of aggregated items to be displayed in the list aggregate region 660, the aggregated items are densely arranged in the list aggregate region 660; and when there are a small number of aggregated items, the aggregated items are sparsely arranged in the list aggregate region 660.

Figure 7:
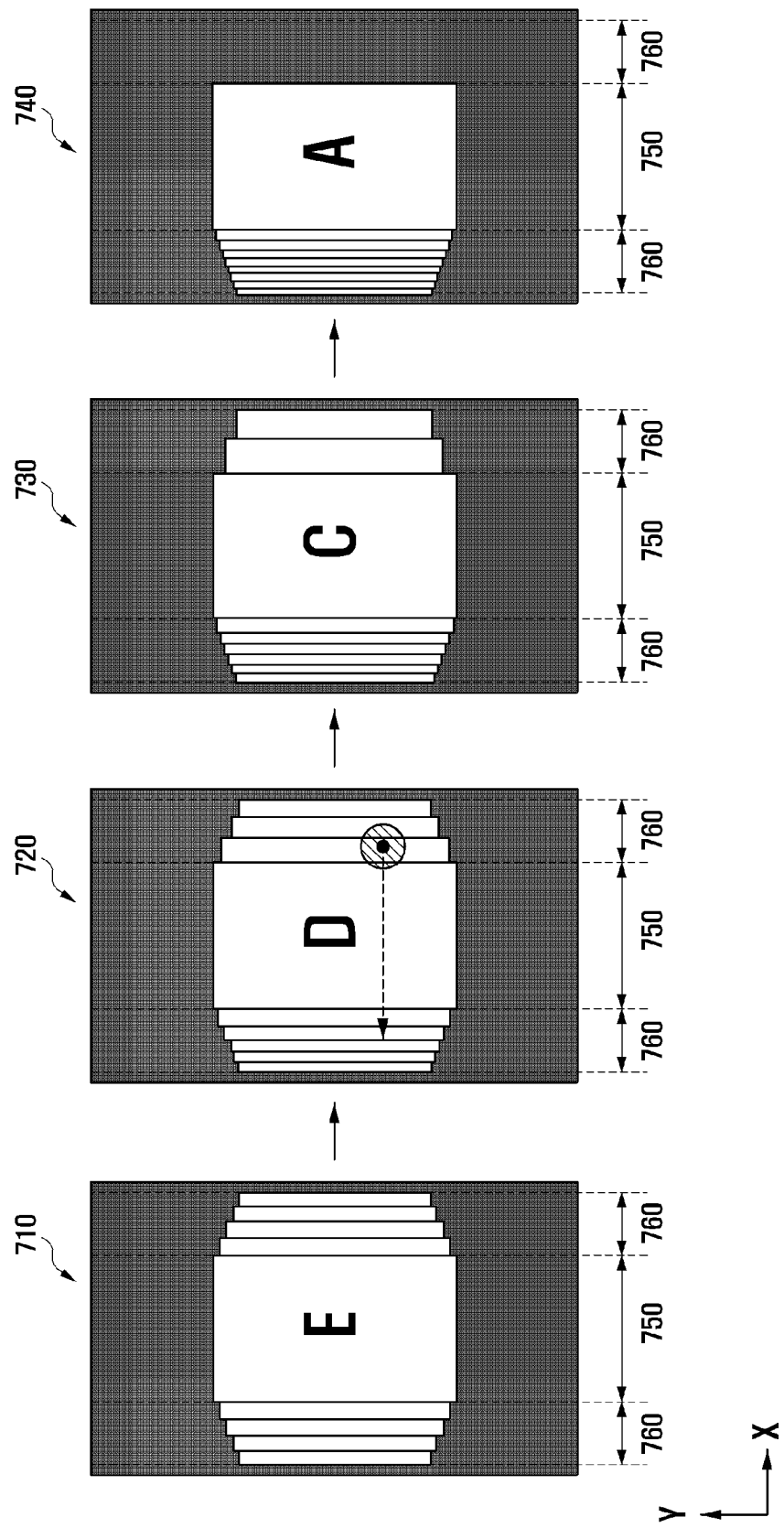
FIG. 7 illustrates a graphic representation of processing for viewing a list display according to a fifth embodiment.

FIG. 7 illustrates a graphic representation of processing for a list display according to a fifth embodiment.

Referring to FIG. 7, the display unit 232 assigns a list view region 750 and list aggregate regions 760 in the visible area as shown in element 710. In this embodiment, a single item is displayed in the list view region 750.

In this illustrated example, an item E is displayed in the list view region 750, other items are stacked behind the viewable element E in aggregated regions 760 (left and right). As the user scrolls through the list (as indicated by the hashed circle and the directional arrow), an item D is displayed in the list view region 750 at element 720. Similarly, an item C is displayed in the list view region 750 at element 730, and an item A is displayed at step 740 as the scroll operations continues. Note the display of item B is not shown as it would be recognized that the scrolling may continue until the end of the list (as represented by item A) is achieved. Note also that when the end of the list (item A) is displayed, the right aggregated region 760 is empty and the left aggregated region 760 contains all aggregated items.

It would be understood that the scrolling may be performed individually on each item by tapping the item and moving in the scrolling direction. Or the scrolling may be performed automatically in response to a single scroll input (i.e., a flick, wherein a speed and direction of the movement is analyzed and used to determine how many movements are to occur).

The display unit 232 displays aggregated items in an aggregate form in the list aggregate regions 760. In FIG. 7, when displayed, aggregated items are behind the viewable item (in a direction receding from the screen) so as to represent a perspective view. An aggregated item near the viewable item may be located before another aggregated item far from the viewable item (in a direction protruding from the screen). Hence, the nearest aggregated item from the viewable item appears largest. In left and right directions, an aggregated item near the viewable item may be located nearer to the list view region 750 than another aggregated item far from the viewable item. When put together, the aggregated items are displayed in the form of stairs.

The area of a list aggregate region 760 is constant, but the number of aggregated items to be displayed in the list aggregate region 760 may differ. When there are a large number of aggregated items to be displayed in the list aggregate region 760, the aggregated items are densely arranged in the list aggregate region 760; and when there are a small number of aggregated items, the aggregated items are sparsely arranged in the list aggregate region 760. The density of the aggregated items may be determined so that at least some part of each item in the aggregated region is visible. However, the density may be so large that it is not possible to view some part of each item. In this case, the number of items in the aggregated region may be limited so that at least a minimum portion (or part) of each item in the aggregated region is visible.

Figure 8:
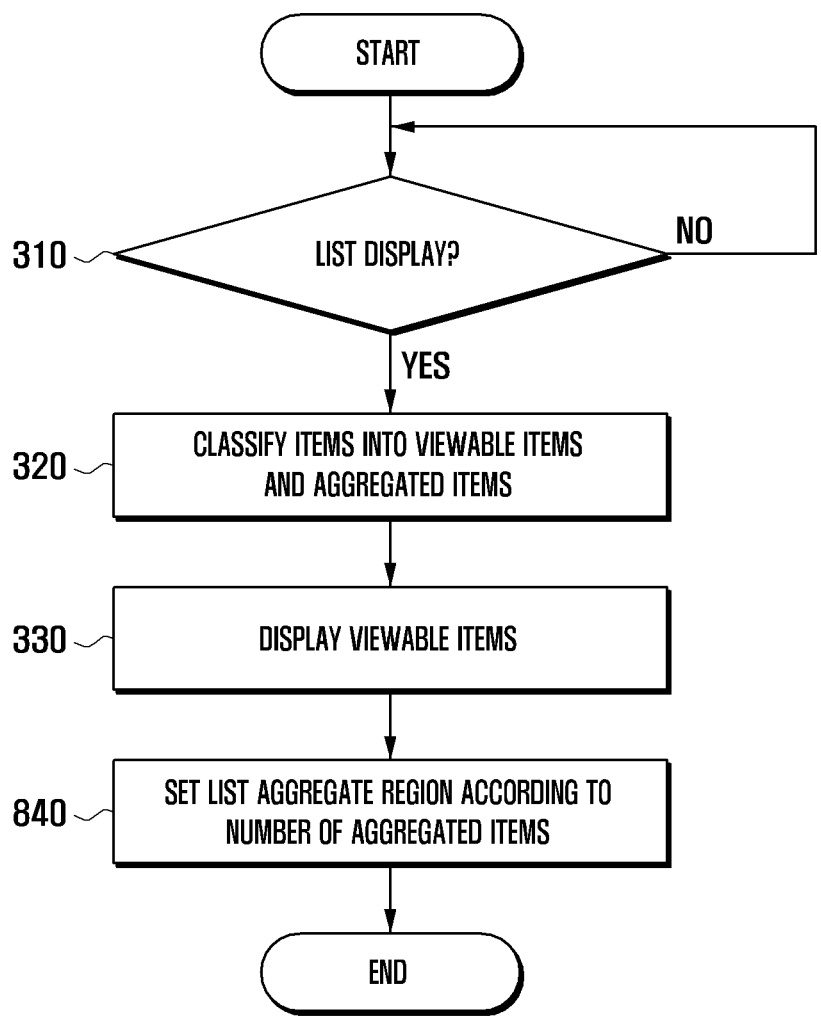
FIG. 8 illustrates a flow chart of a list display method according to a sixth embodiment.

FIG. 8 is a flowchart of a list display method according to a sixth embodiment of the present invention.

Steps 310 to 330 of FIG. 8 correspond respectively to steps 310 to 330 of FIG. 3, and a description thereof is omitted.

At step 840, the display unit 232 displays aggregated items in the list aggregate region, which is set up according to the number of aggregated items. Display of the aggregated items is described in detail with reference to FIGS. 9 to 11.

Figure 9:
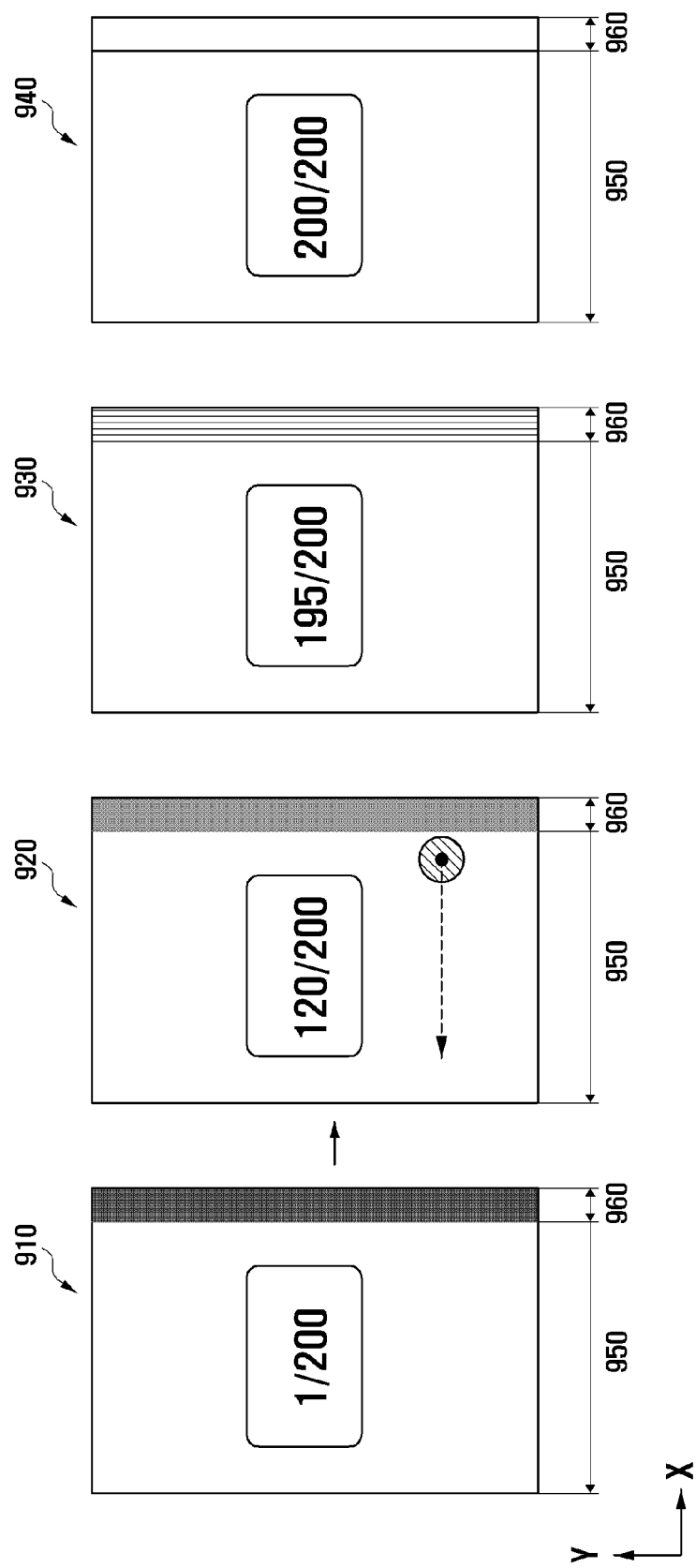
FIG. 9 illustrates a graphic representation of processing for viewing a list display according to a seventh embodiment.

FIG. 9 illustrates graphic representations of processing for a list display according to a seventh embodiment. In this illustrated example, the list items may present pages (or parts of pages) of an electronic book (e-book). E-books are well known in the art and e-book readers, for example AMAZON KINDLE and Barnes and Noble NOOK are well-known e-book reads. AMAZON and KINDLE are trademarks of the Amazon Technologies, Inc., NOOK is a trademark of Fission LLC, and Barnes and Noble is a registered trademark of Barnes and Noble Bookstores, Inc.

With reference to element 910 in FIG. 9, the display unit 232 assigns a list view region 950 and a list aggregate region 960 in the visible area. In this illustrated case, a single list aggregate region 960 is present on the right side of the view region 950. In FIG. 9, items following the viewable item correspond to aggregated items. The presentation of the contents of the list aggregate region 960 may change according to the number of items following the viewable item. In another embodiment, items preceding the viewable item may correspond to aggregated items and may be included in a not shown aggregated region on the left side of the view region 950. Like turning over pages of a book, odd and even pages may alternate and the contents and location of the list aggregate region 960 may change accordingly.

The display unit 232 displays a viewable item in the list view region 950. At element 910, a first page out of 200 pages may be displayed in the list view region 950. As the user scrolls through the list (as indicated by the hashed circle and the directional arrow), additional pages of the e-book may be moved from the aggregated region 960 to the view region 950. For example, in this illustrated example, the 120-th page is displayed in the list view region 950 at element 920 as the user continues to scroll through the pages. Similarly, the 195-th page may be displayed in the list view region 950 at element 930, and the 200-th page may be displayed at element 940, in response to a scroll input.

In this illustrated embodiment, the display unit 232 displays a number of lines corresponding to a number of aggregated items in the list aggregate region 960. At element 940, as no aggregated items are present, no indication (lines) of further pages is drawn in the list aggregate region 960. However, at element 930, as five pages are present after the viewable item, five lines are drawn in the list aggregate region 960. Similarly, 80 lines and 199 lines may have to be drawn at elements 920 and 910, respectively. However, the list aggregate region 960 has size and resolution limitations. Hence, when there are too many lines to be drawn, it is possible to use brightness to indicate the number of aggregated items. That is, when the number of aggregated items is large, the list aggregate region 960 may have a low-brightness color and when the number of aggregated items is small, the list aggregate region 960 may have a high-brightness color. For example, at step 910, the list aggregate region 960 may be filled with a black color (RGB value of (0, 0, 0)) corresponding to 199 aggregated items; and, at step 920, the list aggregate region 960 may be filled with a gray color (RGB value of (150,150,150)) corresponding to 80 aggregated items. The color and saturation of the list aggregate region 960 may be changed according to a user setting. Alternatively, when the number of aggregated items is large, the list aggregate region 960 may have a high-brightness color and when the number of aggregated items is small, the list aggregate region 960 may have a low-brightness color.

As described above, when reading an e-book, the user may estimate the remaining pages using the color of, or number of lines within, the list aggregate region 960.

Figure 10:
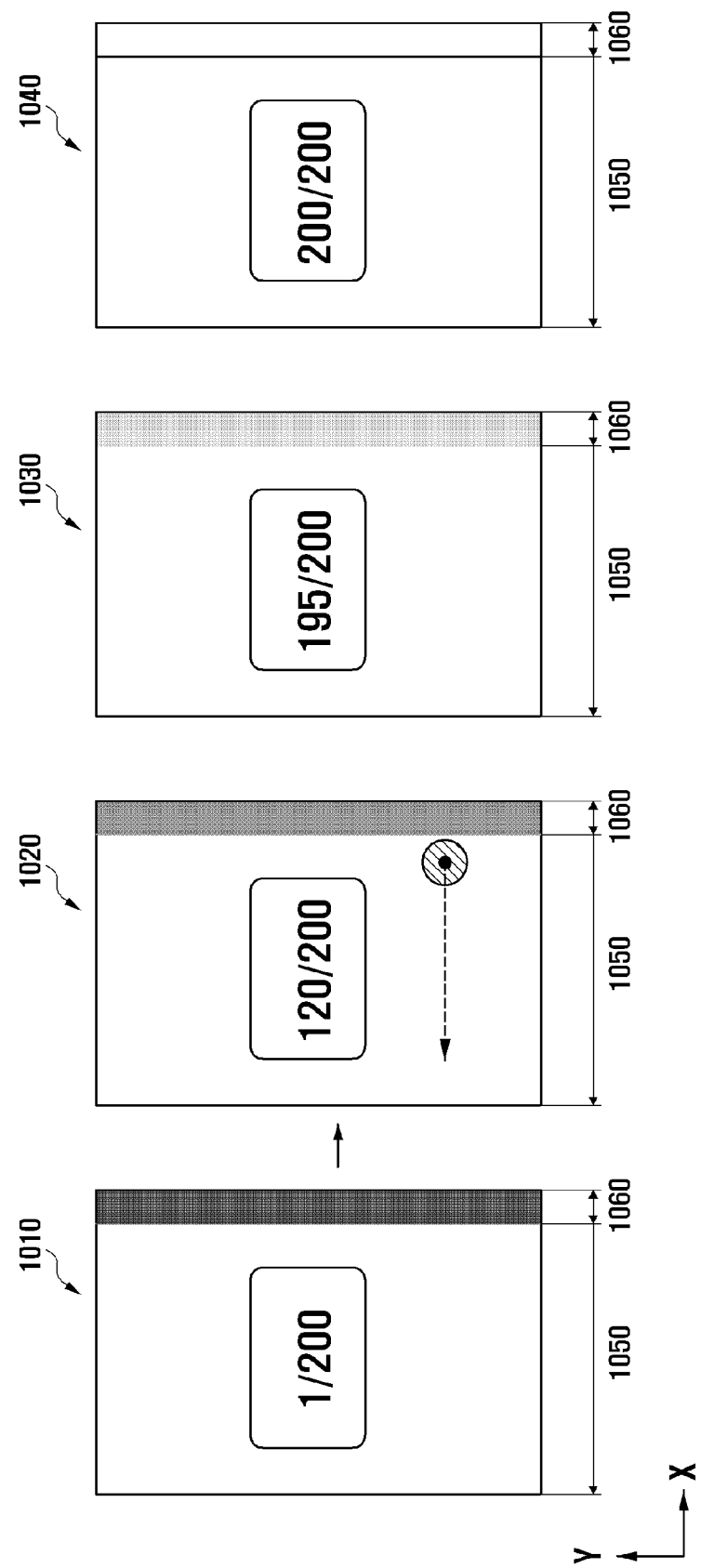
FIG. 10 illustrates a graphic representation of processing for viewing a list display according to an eighth embodiment.

FIG. 10 illustrates graphic representations for processing of a list display according to an eighth embodiment, wherein the number of aggregated items is indicated by the brightness of the list aggregate region 1060 even when the number of aggregated items is small.

In this embodiment, the display unit 232 assigns a list view region 1050 and a list aggregate region 1060 in the visible area, as previously described. In FIG. 10, a single list aggregate region 1060 is present; items following the viewable item correspond to aggregated items. However, it would be understood that a second aggregate region 1060 may be included which collects items that were in the view region 1050 as the user scrolls from right to left. In this illustrated example, the brightness of the list aggregate region 1060 may change according to the number of items following the viewable item. Alternatively, items preceding the viewable item may correspond to aggregated items. Like turning over pages of a real book, odd and even pages may alternate and the contents and location of the list aggregate region 1060 may change accordingly.

The display unit 232 displays a viewable item in the list view region 1050. Viewable items at steps 1010 to 1040 are respectively identical to those at steps 910 to 940 of FIG. 9, and a description thereof is omitted.

The display unit 232 sets the brightness of the list aggregate region 1060 according to the number of aggregated items. For example, at step 1040, as no aggregated item is present, the list aggregate region 1060 may be filled with a white color (RGB value of (255, 255, and 255)). At step 1030, the list aggregate region 1060 may be filled with a bright gray color (RGB value of (240, 240, 240)) corresponding to 5 aggregated items. Initially, at step 1010, the list aggregate region 1060 may be filled with a black color (RGB value of (0, 0, 0)) corresponding to 199 (i.e., all) aggregated items. At step 1020, the list aggregate region 1060 may be filled with a medium gray color (RGB value of (150,150,150)) corresponding to 80 aggregated items. The color and saturation of the list aggregate region 1060 may be changed according to a user settings. Alternatively, when the number of aggregated items is large, the list aggregate region 1060 may have a high-brightness color; and when the number of aggregated items is small, the list aggregate region 1060 may have a low-brightness color.

As described above, when reading an e-book, the user may estimate the remaining pages based upon the brightness of the list aggregate region 1060.

Although, FIGS. 9 and 10 refer to reading an e-book by scrolling right-to-left to read the pages of the e-book, it would recognized that the process described may be applicable to e-books that are written in a left-to-right manner (e.g., Hebrew, Arabic) or applicable to e-books that are written in a vertical manner (e.g., Chinese). In these alternative embodiments, the aggregate region 960 or 1060 may be included on the left side or the upper boundary of the view region 950 or 960.

Figure 11:
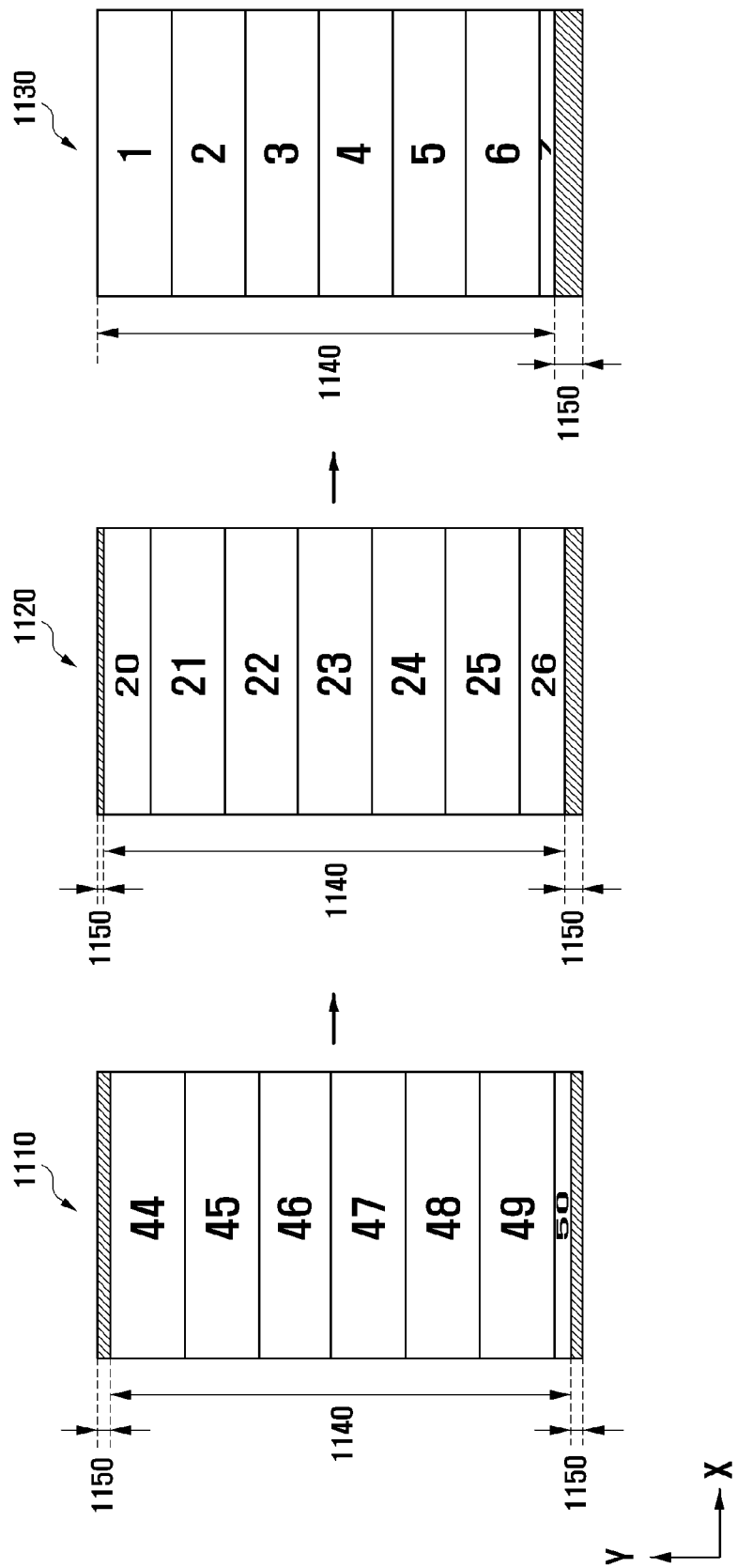
FIG. 11 illustrates graphic representation of processing for viewing a list display list display according to a ninth embodiment.

FIG. 11 illustrates a graphic representation of processing for a list display according to a ninth embodiment, wherein the display unit 232 assigns a list view region 1140 and list aggregate regions 1150 in the visible area, as previously described. Here, the area or size of the list aggregate region 1150 may change according to the number of aggregated items.

The display unit 232 displays viewable items in the list view region 1140. At step 1110, items 44 to 50 are displayed in the list view region 1140; at step 1120, items 20 and 26 are displayed in the list view region 1140; and at step 1130, items 1 to 7 are displayed in the list view region 1140.

The display unit 232 determines the area of the list aggregate region 1150 according to the number of aggregated items. For example, the list aggregate region 1150 may have an area corresponding to the product of the number of aggregated items, a height of 0.1 mm, and the width of the visible area. At step 1110, the upper list aggregate region 1150 may have a height of 4.3 mm corresponding to 43 aggregated items; at step 1120, the upper list aggregate region 1150 may have a height of 1.9 mm corresponding to 19 aggregated items; and at step 1130, the upper list aggregate region 1150 may have a height of 0 mm corresponding to zero aggregated items (i.e., the upper list aggregate region 1150 is not present). The same procedure may be applied to the lower list aggregate region 1150. To allow the user to be able to distinguish the list view region 1140 from the list aggregate regions 1150, the display unit 232 may fill the list aggregate regions 1150 with a preset color or pattern. The user may estimate the number of aggregated items on the basis of the area of the list aggregate region 1150. According to the embodiment of FIG. 11, any items that are in the aggregate region 1150 are not actually displayed but only the heights of the aggregate regions 1150 indicate the quantity of aggregated items. Even though, for some particular reason, some items such as 7, 20, 26 and 50 can be displayed in a compressed view, the items 7, 20, 26 and 50 themselves are nevertheless actually displayed. Therefore the items 7, 20, 26 and 50 are in the list view region 1140.

It is known to those skilled in the art that blocks of a flowchart and a combination of flowcharts may be represented and executed by computer program instructions. These computer program instructions may be loaded on a processor of a general purpose computer, a special computer or programmable data processing equipment. When the loaded program instructions are executed by the processor, they create a means (a special purpose computer) for carrying out the functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the present invention, the word "unit", "module" or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

The mobile terminal of the present invention may be a portable electronic device, such as a cellular phone, a smart phone, a personal digital assistant (PDA), a navigation aid, a digital broadcast receiver or a portable multimedia player (PMP).

The description of the various embodiments is to be construed as exemplary only and does not describe every possible instance of the invention. Therefore, it should be understood that various changes may be made and equivalents may be substituted for elements of the invention.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims.

What is claimed is:

1. A method comprising:
classifying, by a processor, a first set of one or more items in a list as viewable items and a second set of one or more other items in the list as aggregated items;
displaying, on a display unit, a view region, wherein displaying the view region includes displaying the viewable items; and
displaying, on the display unit, an aggregate region representing at least some of the aggregated items;
wherein the list is organized in an order and displaying the aggregate region includes: (i) displaying in full an aggregated item that is last in the order; and (ii) displaying partially, between the aggregated item that is last in the order and the view region, one or more other aggregated items; and
wherein the aggregated item that is last in the order is displayed in a brightness of color that is based on a count of the aggregated items represented by the aggregate region.

2. The method of claim 1, wherein displaying the aggregate region includes displaying the aggregated item that is last in the order at a tilt relative to the view region, the tilt creating a visual appearance of the aggregated item receding away from the view region and a point of view of any person viewing the view region on the display unit.

3. The method of claim 1, wherein displaying the aggregate region includes displaying at least some of the other aggregated items in a stacked arrangement.

4. The method of claim 1, wherein the aggregate region is displayed based on the order.

5. The method of claim 1, wherein displaying the aggregate region includes displaying only one aggregate region together with the view region, the aggregate region representing fewer than all of the aggregated items.

6. The method of claim 1, wherein displaying the aggregate region comprises drawing lines based on the count of the aggregated items represented by the aggregate region.

7. The method of claim 1, wherein an area of the aggregate region is proportional to the count of the aggregated items represented by the aggregate region.

8. An electronic device comprising a display unit and a processor, the processor being configured to:
classify a first set of one or more items in a list as viewable items and a second set of one or more other items in the list as aggregated items;
display, on the display unit, a view region, wherein displaying the view region includes displaying the viewable items; and display, on the display unit, an aggregate region representing at least some of the aggregated items;
wherein the list is organized in an order and displaying the aggregate region includes: (i) displaying in full an aggregated item that is last in the order; and (ii) displaying partially, between the aggregated item that is last in the order and the view region, one or more other aggregated items; and
wherein the aggregated item that is last in the order is displayed in a brightness of color that is based on a count of the aggregated items represented by the aggregate region.

9. The electronic device of claim 8, wherein displaying the aggregate region includes displaying an aggregated item that is last in the order at a tilt relative to the view region, the tilt creating a visual appearance of the aggregated item receding away from the view region and a point of view of any person viewing the view region on the display unit.

10. The electronic device of claim 8, wherein displaying the aggregate region includes displaying at least some of the other aggregated items in a stacked arrangement.

11. The electronic device of claim 8, wherein the aggregate region is displayed based on the order.

12. The electronic device of claim 8, wherein displaying the aggregate region includes displaying only one aggregate region together with the view region, the aggregate region representing fewer than all of the aggregated items.

13. The electronic device of claim 8, wherein displaying the aggregate region comprises drawing lines based on the count of the aggregated items represented by the aggregate region.

14. The electronic device of claim 8, The electronic device of claim 10 wherein an area of the aggregate region is proportional to the count of the aggregated items represented by the aggregate region.

* * * * *

UNITED STATES PATENT AND TRADEMARK OFFICE
CERTIFICATE OF CORRECTION

PATENT NO. : 9,323,427 B2
APPLICATION NO. : 13/270337
DATED : April 26, 2016
INVENTOR(S) : Seock Hyun Yu et al.

Page 1 of 1

It is certified that error appears in the above-identified patent and that said Letters Patent is hereby corrected as shown below:

Claims

Column 14, Claim 14, Line 14, after claim 8, delete, "The electronic device of claim 10"
and insert:
--...The electronic device of claim 8, wherein...--

Signed and Sealed this
Twenty-first Day of June, 2016

Michelle K. Lee
*Director of the United States Patent and Trademark Office*